United States Patent
Ball et al.

(10) Patent No.: US 10,277,588 B2
(45) Date of Patent: Apr. 30, 2019

(54) SYSTEMS AND METHODS FOR AUTHENTICATING A USER BASED ON SELF-PORTRAIT MEDIA CONTENT

(71) Applicant: Facebook, Inc., Menlo Park, CA (US)

(72) Inventors: Allison Elaine Ball, Austin, TX (US); Franklin Ray Gaw, San Francisco, CA (US); Sameer Madan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 205 days.

(21) Appl. No.: 14/531,458

(22) Filed: Nov. 3, 2014

(65) Prior Publication Data

US 2016/0127360 A1   May 5, 2016

(51) Int. Cl.
| | |
|---|---|
| G06F 3/048 | (2013.01) |
| H04L 29/06 | (2006.01) |
| G06F 21/32 | (2013.01) |
| H04W 12/06 | (2009.01) |
| G10L 17/24 | (2013.01) |
| G10L 17/10 | (2013.01) |

(52) U.S. Cl.
CPC .......... *H04L 63/0861* (2013.01); *G06F 21/32* (2013.01); *H04W 12/06* (2013.01); *G10L 17/10* (2013.01); *G10L 17/24* (2013.01)

(58) Field of Classification Search
CPC ..... G06F 21/32; H04L 63/0861; G10L 17/24; G10L 17/10; H04W 12/06
See application file for complete search history.

(56) References Cited

U.S. PATENT DOCUMENTS

| | | | | |
|---|---|---|---|---|
| 8,838,970 | B1* | 9/2014 | Suresh | G06F 21/316 713/168 |
| 8,886,953 | B1* | 11/2014 | Sipe | G06F 21/32 713/186 |
| 9,430,629 | B1* | 8/2016 | Ziraknejad | G06F 21/32 |
| 2011/0038512 | A1* | 2/2011 | Petrou | G06F 17/30256 382/118 |
| 2012/0281885 | A1* | 11/2012 | Syrdal | G10L 17/24 382/116 |
| 2013/0015946 | A1* | 1/2013 | Lau | G07C 9/00 340/5.2 |
| 2013/0104205 | A1* | 4/2013 | Hsi | G06F 21/36 726/6 |
| 2013/0227678 | A1* | 8/2013 | Kang | G06F 21/32 726/19 |
| 2013/0246270 | A1* | 9/2013 | Du | G06K 9/00288 705/44 |
| 2015/0242605 | A1* | 8/2015 | Du | G06F 21/32 726/7 |

* cited by examiner

*Primary Examiner* — Andrew T Chiusano
(74) *Attorney, Agent, or Firm* — Sheppard Mullin Richter & Hampton LLP

(57) ABSTRACT

Systems, methods, and non-transitory computer-readable media can receive an indication that a user is attempting to authenticate as a particular identity. A media content item captured using a front-facing device camera can be acquired. The media content item can include graphical data representing the user. The graphical data can be analyzed, at least in part, to produce a confidence score representing a likelihood that the user corresponds to the particular identity. The user can be authenticated as the particular identity when the confidence score at least meets a specified authentication threshold.

20 Claims, 10 Drawing Sheets

SYSTEMS AND METHODS FOR AUTHENTICATING A USER BASED ON SELF-PORTRAIT MEDIA CONTENT

FIELD OF THE INVENTION

The present technology relates to the field of authentication. More particularly, the present technology relates to techniques for authenticating a user based, at least in part, on self-portrait media content.

BACKGROUND

Today, people often utilize computing devices (or systems) for a wide variety of purposes. Users can use their computing devices to, for example, interact with one another, create content, share information, and access information. In some instances, certain actions to be performed on a computing device of a user may require the user to be authenticated before the actions can be performed. In some cases, a user can store private, sensitive, or important information on his or her computing device. As such, the user may desire to lock or otherwise secure access to his or her computing device.

Conventional approaches generally involve the user setting a password, a passcode, or a swipe pattern for authentication purposes, such as in order to secure access to the user's computing device. However, under conventional approaches, the user may sometimes forget his or her password, passcode, or swipe pattern. Further, in some cases, another person can steal or illegitimately acquire the user's password, passcode, or swipe pattern. The other person can thus become illegitimately authenticated as the user and gain access the user's computing device. As such, conventional approaches can be inefficient, ineffective, and unreliable, and can create challenges for or reduce the overall user experience associated with utilizing computing devices (or systems).

SUMMARY

Various embodiments of the present disclosure can include systems, methods, and non-transitory computer readable media configured to receive an indication that a user is attempting to authenticate as a particular identity. A media content item captured using a front-facing device camera can be acquired. The media content item can include graphical data representing the user. The graphical data can be analyzed, at least in part, to produce a confidence score representing a likelihood that the user corresponds to the particular identity. The user can be authenticated as the particular identity when the confidence score at least meets a specified authentication threshold.

In an embodiment, an instruction for user to utter a vocal response while the media content item is being captured can be provided. Audio data including the vocal response can be captured using a device microphone. In some cases, the media content item can correspond to a video and the audio data can be incorporated within the video. The vocal response included in the audio data can be analyzed, based on a speech recognition process, to determine whether the vocal response matches, within an allowable deviation, an expected response associated with the instruction. In some instances, the confidence score can be increased when the vocal response matches the expected response within the allowable deviation.

In an embodiment, the analyzing of the graphical data can include utilizing an image analysis process to compare a representation of a face of the user included in the graphical data with a verified representation of a face associated with the particular identity.

In an embodiment, information, other than the graphical data, associated with the media content item can be acquired. The information associated with the media content item can be analyzed. The confidence score can be further based, at least in part, on the information associated with the media content item.

In an embodiment, the information, other than the graphical data, associated with the media content item can include at least one of audio data included in the media content item, media metadata, media resolution data, media classification data, media tag data, camera orientation data when the media content item was captured, location data when the media content item was captured, or time data when the media content item was captured.

In an embodiment, the analyzing of the information associated with the media content item can include analyzing the audio data. The analyzing of the audio data can include utilizing a voice recognition process to compare a representation of a voice of the user included in the audio data with a verified representation of a voice associated with the particular identity.

In an embodiment, the analyzing of the information associated with the media content item can include analyzing the location data. The analyzing of the location data can include comparing a current location of the user included in the location data with a verified location with which the particular identity is currently expected to be associated.

In an embodiment, various weight factors can be assigned to the information associated with the media content item. In some cases, the confidence score can be based, at least in part, on the weight factors.

In an embodiment, the media content item can be prepared for manual review when the confidence score fails to at least meet the specified authentication threshold but at least meets a specified manual review threshold. The specified authentication threshold can be higher than the specified manual review threshold.

In an embodiment, the media content item can include at least one of a self-portrait image or a self-portrait video. In some instances, the media content item can be captured live. In some cases, the media content item can exclude content items stored in a device media library.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
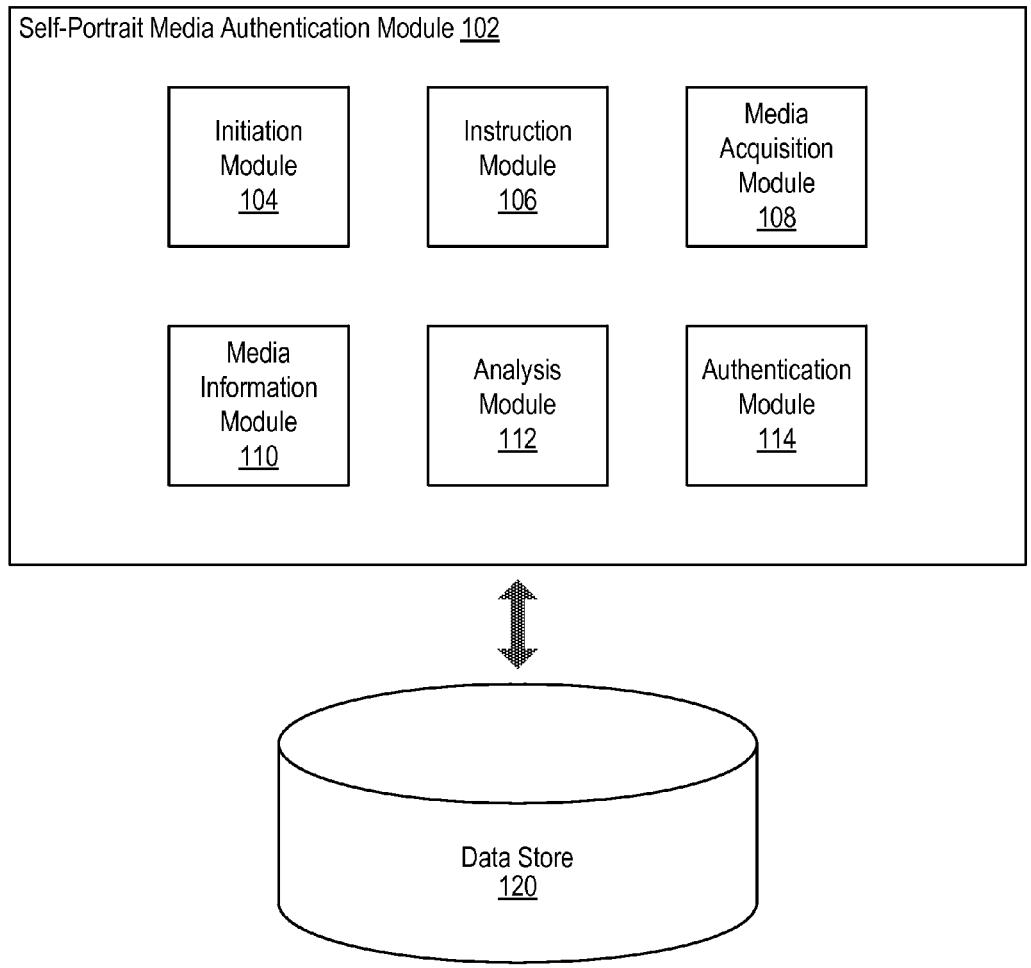
FIG. 1 illustrates an example system including an example self-portrait media authentication module configured to facilitate authenticating a user based on self-portrait media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Authenticating a User Based on Self-Portrait Media Content

People use computing devices (or systems) for a wide variety of purposes. Computing devices can provide different kinds of functionality. Users can utilize their computing devices to produce information, access information, and share information. In some cases, in order to utilize their computing devices, users must first be authenticated. For example, when a screen for a computing device locks, a user of the computing device must input the correct password, passcode, swipe pattern, or fingerprint, etc., in order to unlock the computing device screen. In another example, when a user is attempting to access an online service, such as an account with a social networking service (or system), the user has to provide the correct credentials in order to successfully access the online service.

In some instances, a public figure, such as an actor, actress, athlete, politician, company/brand representative, or other personality, can be associated with an official account for an online service (e.g., an official account and/or page with the social networking system, an official account with an online blog, an official account with an online video service, etc.). Before the public figure can access and utilize the official account, the public figure must first be authenticated.

Conventional approaches to authentication and security generally involve having users set passwords, passcodes, swipe patterns, fingerprint samples, or other security keys. When the users attempt to authenticate, the users must provide or input the correct passwords, passcodes, swipe patterns, or fingerprints, etc., However, under conventional approaches, users often times forget their passwords, passcodes, or swipe patterns. Also, under conventional approaches, other people can sometimes steal or illegitimately (e.g., illegally, fraudulently, etc.) acquire these passwords and other security keys. Furthermore, in some cases, the level of security, protection, and reliability offered by such conventional security keys may not be sufficient for certain purposes. As such, these and other concerns associated with conventional approaches can cause authentication to be inefficient, unreliable, and ineffective.

Therefore, an improved approach to authentication can be beneficial for addressing or alleviating various concerns associated with conventional approaches. The disclosed technology enables authentication of a user based, at least in part, on media content captured using a front-facing device camera, such as self-portrait media content items (i.e., "selfies"). Various embodiments of the present disclosure can receive an indication that a user is attempting to authenticate as a particular identity. A media content item captured using a front-facing device camera can be acquired. The media content item can include graphical data representing the user. The graphical data can be analyzed, at least in part, to produce a confidence score representing a likelihood that the user corresponds to the particular identity. The user can be authenticated as the particular identity when the confidence score at least meets a specified authentication threshold. It is contemplated that there can be many variations and/or other possibilities.

FIG. 1 illustrates an example system 100 including an example self-portrait media authentication module 102 configured to facilitate authenticating a user based on self-portrait media content, according to an embodiment of the present disclosure. As shown in the example of FIG. 1, the self-portrait media authentication module 102 can include an initiation module 104, an instruction module 106, a media acquisition module 108, a media information module 110, an analysis module 112, and an authentication module 114. In some instances, the example system 100 can also include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the self-portrait media authentication module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the self-portrait media authentication module 102 can be implemented, in part or in whole, as software running on one or more computing devices or systems, such as on a user or client computing device. For example, the self-portrait media authentication module 102 can be implemented as or within an application (e.g., app), a program, or an applet, etc., running on a user computing device or client computing system. In another example, the self-portrait media authentication module 102 can be implemented using one or more computing devices or systems that include one or more servers, such as network servers or cloud servers. In some instances, the self-portrait media authentication module 102 can, in part or in whole, be implemented within or configured to operate in conjunction with a social networking system (or service), such as the social networking system 930 of FIG. 9. It should be understood that many variations are possible.

The initiation module 104 can be configured to receive an indication that a user is attempting to authenticate as a particular identity. For example, the initiation module 104 can receive the indication by detecting that the user is initiating an attempt to authenticate as the particular identity. In some cases, the user can be attempting to perform an action that requires the user to be authenticated, such as logging into an account with an online service. In some instances, the particular identity that the user is trying to authenticate as can be selected by the user. For example, the user can input a particular username or login name associated with the particular identity.

In another example, the user can be a public figure attempting to access an official account with the social networking (or social media) system. The official account can be verified, such as by the social networking system, to indeed be associated with the public figure. In some cases, it can be verified that the account is owned by the public figure or that the account is managed by an authorized agent or representative of the public figure. As such, the public figure with the verified official account can be considered a verified entity within the social networking system. Continuing with this example, the user can attempt to authenticate as the verified entity, such as when attempting to access the verified official account. To initiate the authentication, the user can select an identifier (e.g., name) for the verified entity. In this example, the initiation module 104 can receive an indication that the user is attempting to initiate authentication as the verified entity and also receive the identifier for the verified entity.

In some implementations, the instruction module 106 can be configured to provide an instruction (e.g., a prompt, directions, an explanation, etc.) to a user when the user attempts to initiate authentication as a particular identity. The instruction module 106 can cause a message to be presented to the user. For example, the message can state "To verify your identity, we need a selfie!" In another example, the message can state "Please tap on the button to capture a selfie." There can be many variations and other possibilities.

The media acquisition module 108 can be configured to facilitate acquiring a media content item captured using a front-facing device camera. The media acquisition module 108 can cause a front-facing camera of a computing device or computing system to capture a self-portrait (or selfie) media content item, such as a selfie image or a selfie video. The media content item can include graphical data representing the user. For example, the user's face or at least a portion thereof can be included in the selfie image or video.

In some implementations, the media acquisition module 108 allows only the front-facing camera of the computing device or system to be used for capturing the media content item. For example, if the computing device or system has a rear-facing camera, the media acquisition module 108 can disregard the rear-facing camera, disable the rear-facing camera, or otherwise ensure that only the front-facing camera is used for capturing the media content item. Moreover, in some embodiments, the media acquisition module 108 can cause the media content item to be captured live. The media acquisition module 108 can prevent the user from using a previously captured media content item for the authentication. For example, the media acquisition module 108 can cause a camera view to be initiated in order to capture the media content item currently, and prevent access to content stored in a library or other storage element of the computing device or system. As such, the media content item acquired for use in the authentication process excludes content items stored in a device (or system) media library, such as a camera roll.

In some embodiments, the self-portrait media authentication module 102 can include the media information module 110. The media information module 110 can be configured to acquire information associated with the media content item. More details regarding the media information module 110 will be provided below with reference to FIG. 2.

The analysis module 112 can be configured to facilitate analyzing, at least in part, the graphical data to produce a confidence score representing a likelihood that the user corresponds to the particular identity. For example, the analysis module 112 can be configured to analyze a portion of the graphical data corresponding to a face of the user, in order to produce the confidence score representing the likelihood that the user corresponds to the particular identity. In some embodiments, the analysis module 112 can communicate and/or operate with the at least one data store 120. The analysis module 112 will be described in more detail below with reference to FIG. 3.

The at least one data store 120 can be configured to store and maintain various types of data. In some implementations, the at least one data store 120 can store information associated with the social networking system (e.g., the social networking system 930 of FIG. 9). The information associated with the social networking system can include data about users, social connections, social interactions, locations, geo-fenced areas, maps, places, events, groups, posts, communications, content, account settings, privacy settings, a social graph, and various other types of data. In some implementations, the at least one data store 120 can store information associated with users, such as user identifiers, user information, user specified settings, content produced by users, and various other types of user data. As shown in the example system 100, the self-portrait media authentication module 102 can be configured to communicate and/or operate with the at least one data store 120.

Furthermore, the authentication module 114 can be configured to facilitate authenticating the user as the particular identity when the confidence score at least meets a specified authentication threshold. For example, the authentication module 114 can cause authentication to be successfully completed, and can determine that the user correctly corresponds to or is correctly associated with the particular identity, when the confidence score at least meets the specified authentication threshold.

In some embodiments, the authentication module 114 can be configured to facilitate preparing the media content item for manual review when the confidence score fails to at least meet the specified authentication threshold but at least meets a specified manual review threshold. The specified authentication threshold can be higher than the specified manual review threshold. For example, if the media content item used for the authentication results in a confidence score that is not high enough for successful authentication, then the media content item can be submitted for manual review in order to decide whether or not the authentication should succeed.

Furthermore, in some embodiments, other factors can influence the confidence score as well. In one example, the instruction module 106 can be configured to provide an instruction or prompt for the user to utter a vocal response while the media content item is being captured. Examples of the instruction or prompt can include "What is today's date?" or "Please say your name." The user can provide the vocal response accordingly. The media acquisition module 108 and/or the media information module 110 can cause audio data including the vocal response to be captured using a device (or system) microphone. In some instances, when the media content item corresponds to a video, the audio data can be incorporated within the video. Continuing with this example, the analysis module 112 can be configured to analyze, based on a speech recognition process, the vocal response included in the audio data. The analysis module 112 can facilitate determining whether the vocal response matches, within an allowable deviation, an expected response associated with the instruction or prompt. If the analysis module 112 determines that the vocal response matches the expected response associated with the instruction or prompt within the allowable deviation, then the confidence score can be increased. It should be appreciated that many variations are possible.

Figure 2:
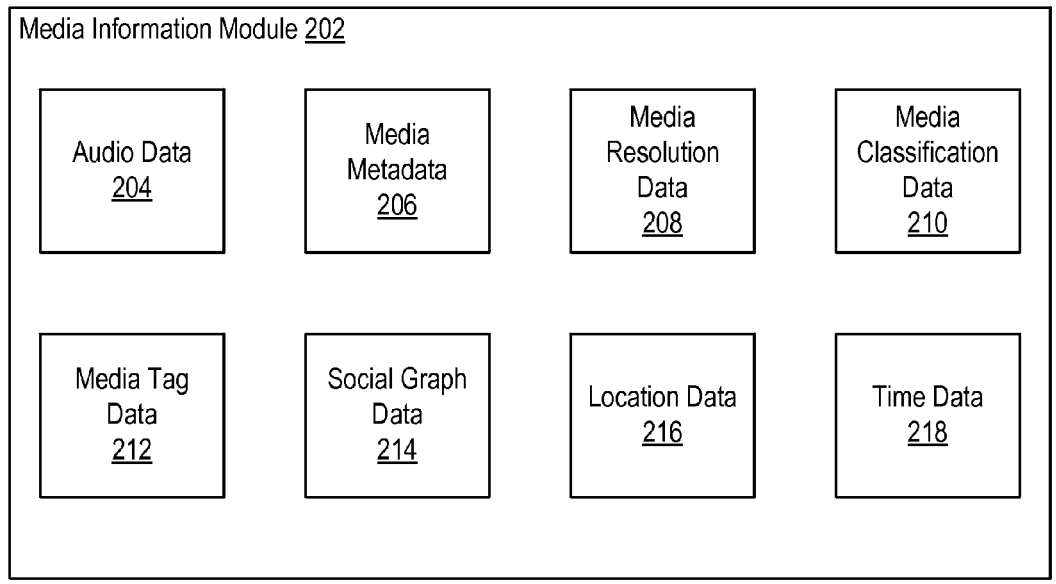
FIG. 2 illustrates an example media information module configured to facilitate authenticating a user based on self-portrait media content, according to an embodiment of the present disclosure.

FIG. 2 illustrates an example media information module 202 configured to facilitate authenticating a user based on self-portrait media content, according to an embodiment of the present disclosure. In some embodiments, the media information module 110 of FIG. 1 can be implemented as the example media information module 202. In some embodiments, the example media information module 202 can be configured to facilitate determining, receiving, or otherwise acquiring information, other than graphical data, associated with a media content item used for authenticating a user. As shown in FIG. 2, the various types of information acquirable by the example media information module 202 can include (but are not limited to) audio data 204 included in the media content item, media metadata 206, media resolution data 208, media classification data 210, media tag data 212, social graph data 214, location data 216 when the media content item was captured, and/or time data 218 when the media content item was captured. Many variations are possible.

For example, the audio data 204 can include acoustic information representing voices, background audio, music, and various other sounds. The media metadata 206 can include properties, characteristics, and other information about the media content item, such as a status (e.g., orientation data) of a camera used to capture the media content item. The media resolution data 208 can indicate the resolution for the media content item. The media classification data 210 can include information about how the media content item is classified, such as via one or more image classification processes. The media tag data 212 can indicate how the media content item has been tagged. The social graph data 214 can include information about the media content item relative to the social networking system. The location data 216 can indicate a location where and when the media content item was captured. The time data 218 can indicate a time and/or date when the media content item was captured. Again, there can be many variations.

Furthermore, in some embodiments, the media information module 202 can communicate or operate with the analysis module 112 of FIG. 1, in order to analyze the acquired information associated with the media content item. As discussed previously, there can be a confidence score representing a likelihood that the user corresponds to the particular identity. In some cases, the confidence score can be further based, at least in part, on the information associated with the media content item. If analysis of the information indicates an increased probability that the user is indeed associated with the particular identity, then the confidence score can be increased as well. Conversely, if analysis of the information indicates a decreased probability that the user is associated with the particular identity, then the confidence score can also be decreased.

Figure 3:
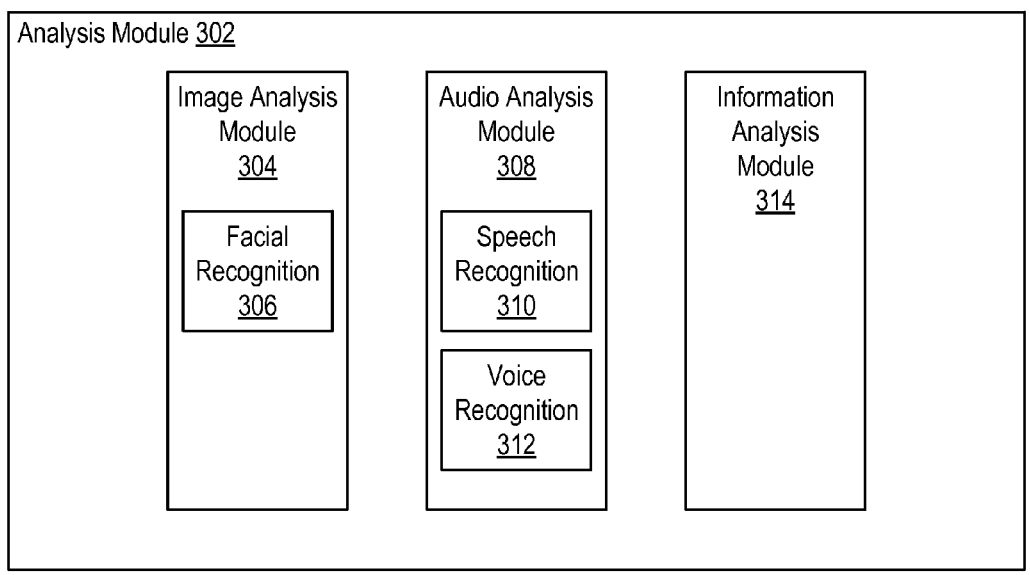
FIG. 3 illustrates an example analysis module configured to facilitate authenticating a user based on self-portrait media content, according to an embodiment of the present disclosure.

FIG. 3 illustrates an example analysis module 302 configured to facilitate authenticating a user based on self-portrait media content, according to an embodiment of the present disclosure. In some embodiments, the analysis module 112 of FIG. 1 can be implemented as the example analysis module 302. As shown in FIG. 3, the example analysis module 302 can include an image analysis module 304, an audio analysis module 308, and an information analysis module 314.

The image analysis module 304 can be configured to facilitate analyzing graphical data included in a media content item for authenticating a user as a particular identity. In some implementations, the image analysis module 304 can utilize one or more image analysis processes or techniques, such as pixel analysis, edge detection, and/or facial recognition 306, etc. For example, the image analysis module 304 can analyze the graphical data by utilizing an image analysis process, such as a facial recognition process 306, to compare a representation of a face of the user included in the graphical data with a verified representation of a face associated with the particular identity. In another example, the image analysis module 304 can submit the media content item for manual review or comparison. Based on how similar the representation of the face of the user is to the verified representation of the face associated with the particular identity, a confidence score can be produced. If the representation of the face of the user is very similar to the verified representation of the face associated with the particular identity, then a high confidence score can be produced. If the representation of the face of the user is very dissimilar to the verified representation of the face associated with the particular identity, then a low confidence score can be produced.

Moreover, the audio analysis module 308 can be configured to facilitate analyzing audio data included in and/or associated with the media content item, such as by utilizing one or more audio analysis processes or techniques. As discussed above, in some cases, the user can provide a vocal response in reply to an instruction or prompt. The audio analysis module 308 can utilize a speech recognition process 310 to analyze the vocal response included in the audio data in order to determine whether the vocal response matches, within an allowable deviation, an expected response associated with the instruction. When the vocal response is determined, based on the speech recognition process 310, to match the expected response within the allowable deviation, then the confidence score can be increased.

Furthermore, in some embodiments, the audio analysis module 308 can analyze the audio data by utilizing a voice recognition process 312 in order to compare a representation of a voice of the user included in the audio data with a verified representation of a voice associated with the particular identity (e.g., voice or acoustic fingerprinting). When the representation of the voice of the user is determined, based on the voice recognition process 312, to be similar to the verified representation of the voice associated with the particular identity, the confidence score can be increased.

The information analysis module 314 can be configured to facilitate analyzing various other types of information associated with the media content item. In one example, information analysis module 314 can analyze location data, such as by comparing a current location of the user included in the location data with a verified location with which the particular identity is currently expected to be associated. If the current location of the user substantially (within an allowable location deviation) matches the verified location, then the confidence score can be increased. In another example, if the media content item is tagged with or includes another person, the information analysis module 314 can assist in analyzing whether or not the user is socially connected with the other person (or how closely they are connected). If the information analysis module 314 determines that the other person is indeed a verified social connection of the user, then the confidence score can be increased. It should be understood that there can be numerous variations, applications, and other possibilities.

In some implementations, various weight factors can be assigned to the various types of information associated with the media content item. The confidence score can be based, at least in part, on the weight factors. In some instances, the verified representation of the face associated with the particular identity can be stored in the at least one data store 120 of FIG. 1. Similarly, the expected response associated with the instruction or prompt, the verified representation of the voice associated with the particular identity, and/or the verified location, etc., can also be stored in the data store 120.

Figure 4:
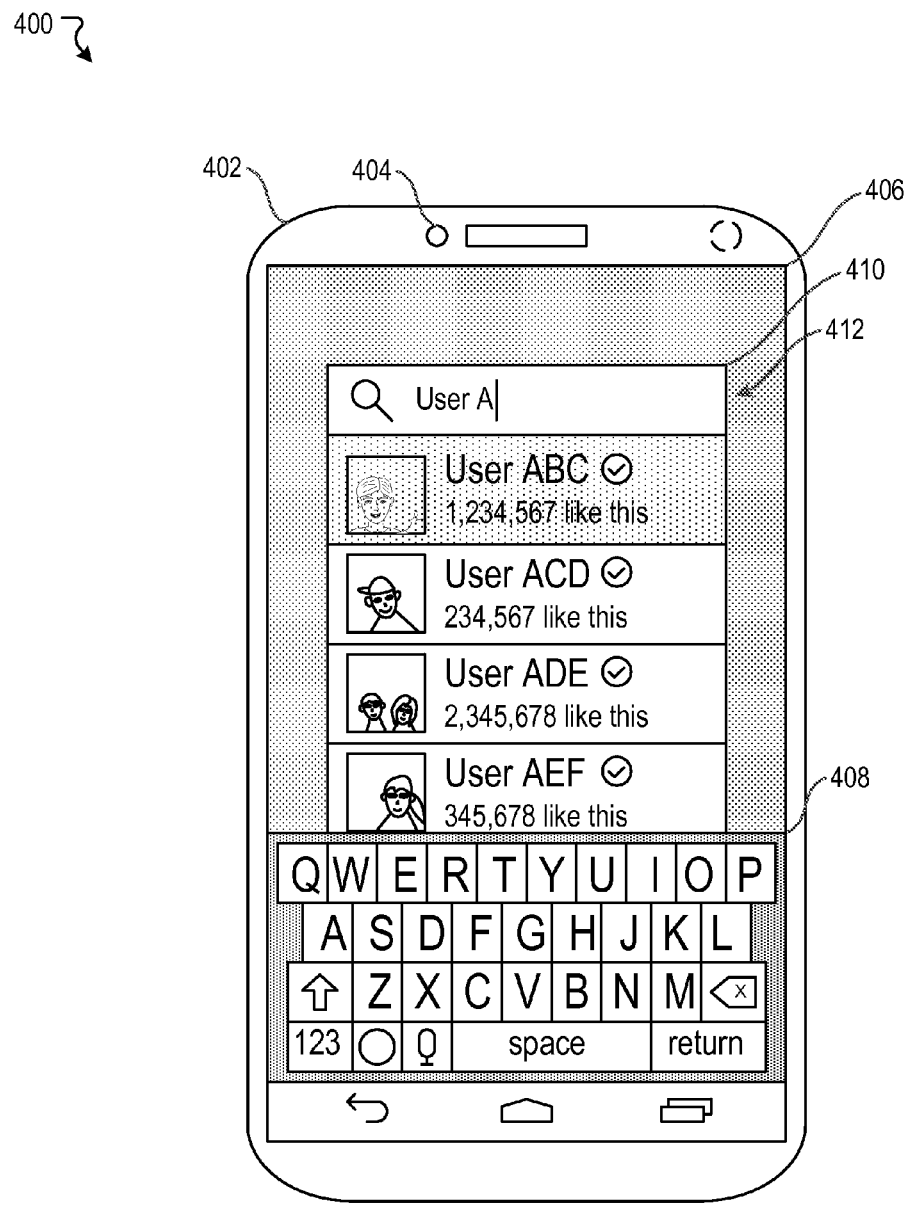
FIG. 4 illustrates an example scenario associated with authenticating a user based on self-portrait media content, according to an embodiment of the present disclosure.

FIG. 4 illustrates an example scenario 400 associated with authenticating a user based on self-portrait media content, according to an embodiment of the present disclosure. In the example scenario 400, there can be an example computing device or system 402. The example computing device or system 402 can include a front-facing camera 404, a display 406, and a keyboard 408.

The front-facing camera 404 can be configured to capture a media content item, such as a selfie image or video of a user. In some implementations, the display 406 can correspond to a touch display for displaying content and for detecting touch gestures. The keyboard 408 can enable the user to provide input.

In the example scenario 400, the display 406 can present an interface 410 associated with authenticating the user as a particular identity. The interface 410 can assist in enabling the user to choose or select the particular identity. The interface 410 can include a search bar 412 for the user to input an identifier (e.g., name) associated with the particular identity. As the user inputs at least a portion of the identifier, a list of potentially matching identifiers can be presented, as shown in the example of FIG. 4. As such, the user can choose or select the particular identity. In the example scenario 400, the user corresponds to User ABC and can thus select "User ABC" as the particular identity.

Figure 5:
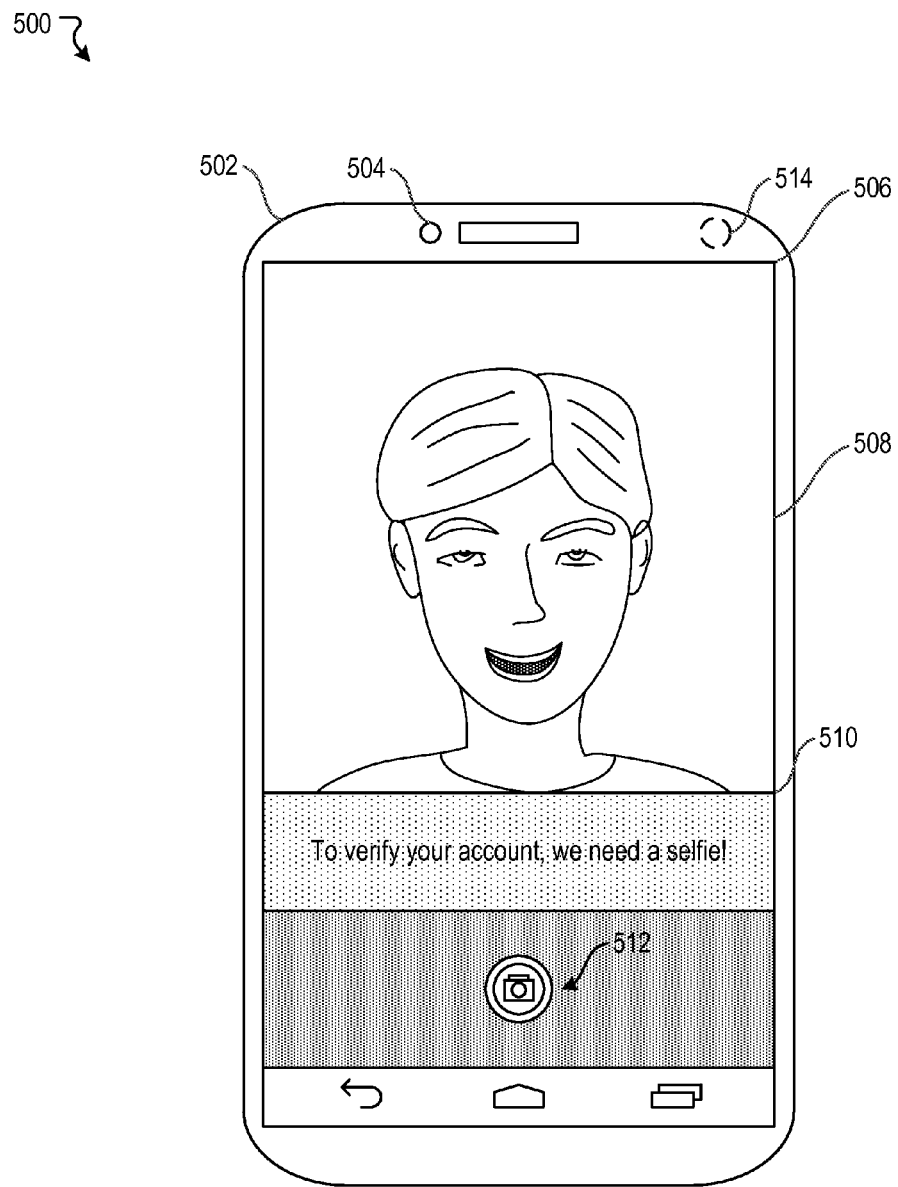
FIG. 5 illustrates an example scenario associated with authenticating a user based on self-portrait media content, according to an embodiment of the present disclosure.

FIG. 5 illustrates an example scenario 502 associated with authenticating a user based on self-portrait media content, according to an embodiment of the present disclosure. In the example scenario 500, there can be an example computing device or system 502. The example computing device or system 502 can include a front-facing camera 504, a display 506, and a rear-facing camera 514.

The front-facing camera 504 can be configured to capture a media content item, such as a selfie image or video of a user, utilized for authenticating the user as a particular identity. In some implementations, the display 506 (e.g., touch display) can present a camera view 508 for the front-facing camera 504. The display 506 can also present an instruction 510 (e.g., prompt, explanation, message, etc.), such as "To verify your account, we need a selfie!" Moreover, there can be an interactive element 512, such as a button, for the user to initiate the capturing of the media content item.

In some implementations, the disclosed technology can allow only the front-facing camera 504 to be used for capturing the media content item. For example, the disclosed technology can disregard or disable the rear-facing camera 514. Further, in some embodiments, the disclosed technology can cause the media content item to be captured live, such as by preventing the user from using a previously captured media content item for the authentication.

Figure 6:
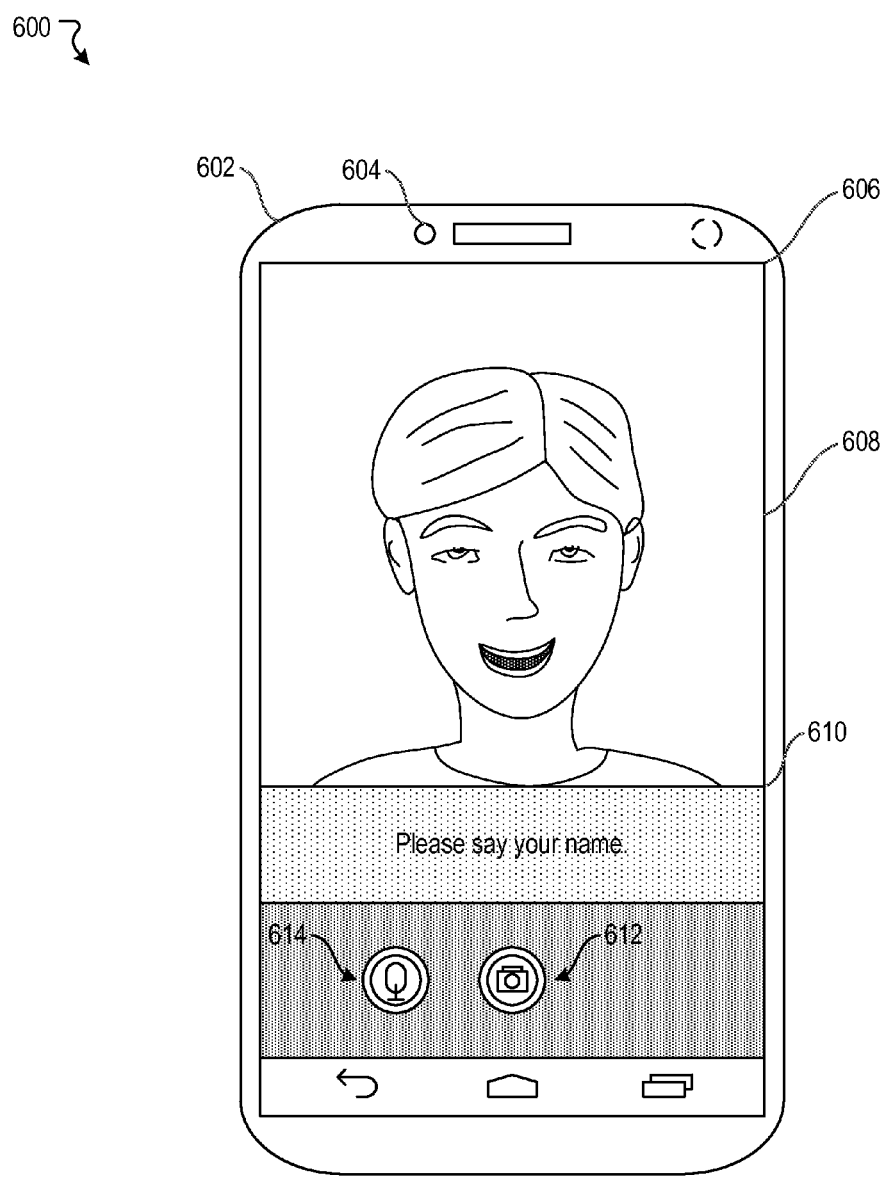
FIG. 6 illustrates an example scenario associated with authenticating a user based on self-portrait media content, according to an embodiment of the present disclosure.

FIG. 6 illustrates an example scenario 600 associated with authenticating a user based on self-portrait media content, according to an embodiment of the present disclosure. In the example scenario 600, there can be an example computing device or system 602. The example computing device or system 602 can include a front-facing camera 604 and a display 606 (e.g., touch display).

The display 606 can present a live camera view 608 for the front-facing camera 604. The display 606 can also present an instruction or prompt 610 for the user to utter a vocal response, which can be used to increase the accuracy or reliability of the authentication, as described previously. In the example scenario 600, there can also be an icon or indicator 612 to indicate that audio is being recorded, such as during the capturing of the media content item.

Figure 7:
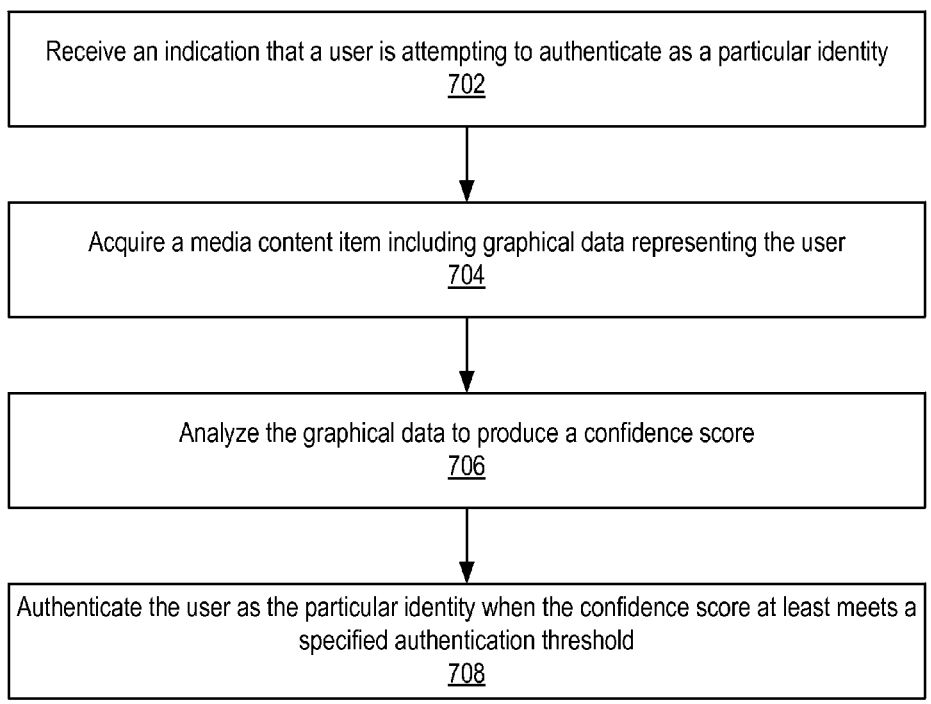
FIG. 7 illustrates an example method associated with authenticating a user based on self-portrait media content, according to an embodiment of the present disclosure.

FIG. 7 illustrates an example method 700 associated with authenticating a user based on self-portrait media content, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can receive an indication that a user is attempting to authenticate as a particular identity. At block 704, the example method 700 can acquire a media content item captured using a front-facing device camera. The media content item can include graphical data representing the user. At block 706, the example method 700 can analyze, at least in part, the graphical data to produce a confidence score representing a likelihood that the user corresponds to the particular identity. At block 708, the example method 700 can authenticate the user as the particular identity when the confidence score at least meets a specified authentication threshold.

Figure 8:
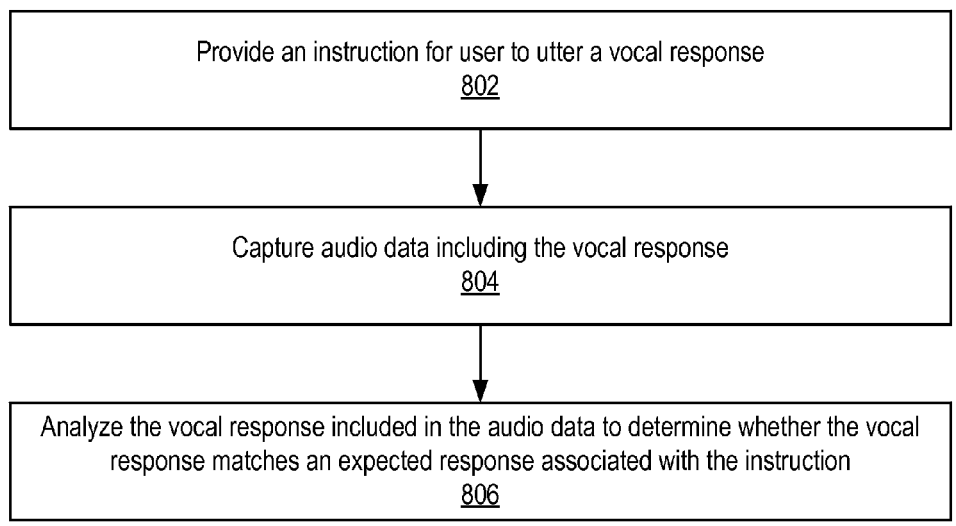
FIG. 8 illustrates an example method associated with authenticating a user based on self-portrait media content, according to an embodiment of the present disclosure.

FIG. 8 illustrates an example method 800 associated with authenticating a user based on self-portrait media content, according to an embodiment of the present disclosure. Again, it should be understood that there can be additional, fewer, or alternative steps performed in similar or alternative orders, or in parallel, within the scope of the various embodiments unless otherwise stated.

At block 802, the example method 800 can provide an instruction for user to utter a vocal response while the media content item is being captured. At block 804, the example method 800 can capture, using a device microphone, audio data including the vocal response. In some cases, the media content item can correspond to a video and the audio data can be incorporated within the video. At block 806, the example method 800 can analyze, based on a speech recognition process, the vocal response included in the audio data to determine whether the vocal response matches, within an allowable deviation, an expected response associated with the instruction. In some instances, the confidence score can be increased when the vocal response matches the expected response within the allowable deviation.

Again, it is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained. In another example, various embodiments of the present disclosure can learn, improve, and/or be refined over time.

Social Networking System—Example Implementation

Figure 9:
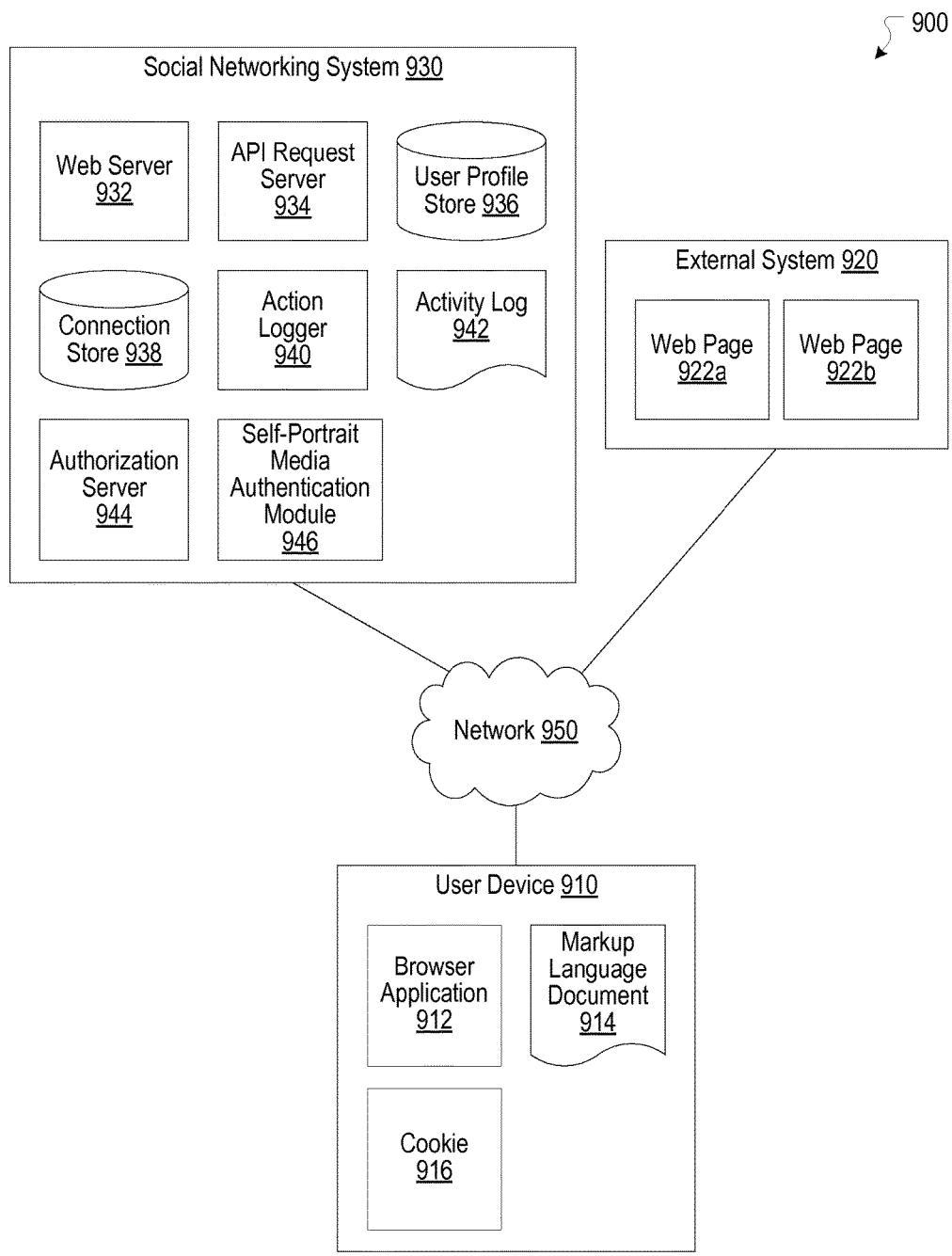
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a self-portrait media authentication module 946. The self-portrait media authentication module 946 can, for example, be implemented as the self-portrait media authentication module 102 of FIG. 1. The self-portrait media authentication module 946 can be configured to facilitate receiving an indication that a user is attempting to authenticate as a particular identity. The self-portrait media authentication module 946 can also be configured to facilitate acquiring a media content item captured using a front-facing device camera. The media content item can include graphical data representing the user. Further, the self-portrait media authentication module 946 can be configured to facilitate analyzing, at least in part, the graphical data to produce a confidence score representing a likelihood that the user corresponds to the particular identity. Moreover, the self-portrait media authentication module 946 can be configured to facilitate authenticating the user as the particular identity when the confidence score at least meets a specified authentication threshold. It should be understood that many variations are possible. For example, in some embodiments, the self-portrait media authentication module can be implemented with or within the user device 910. In another example, some portions of the self-portrait media authentication module can be implemented within the user device 910 and some portions can be implemented within the social networking system 930. Furthermore, other features of the self-portrait media authentication module 946 are discussed herein in connection with the self-portrait media authentication module 102.

Hardware Implementation

Figure 10:
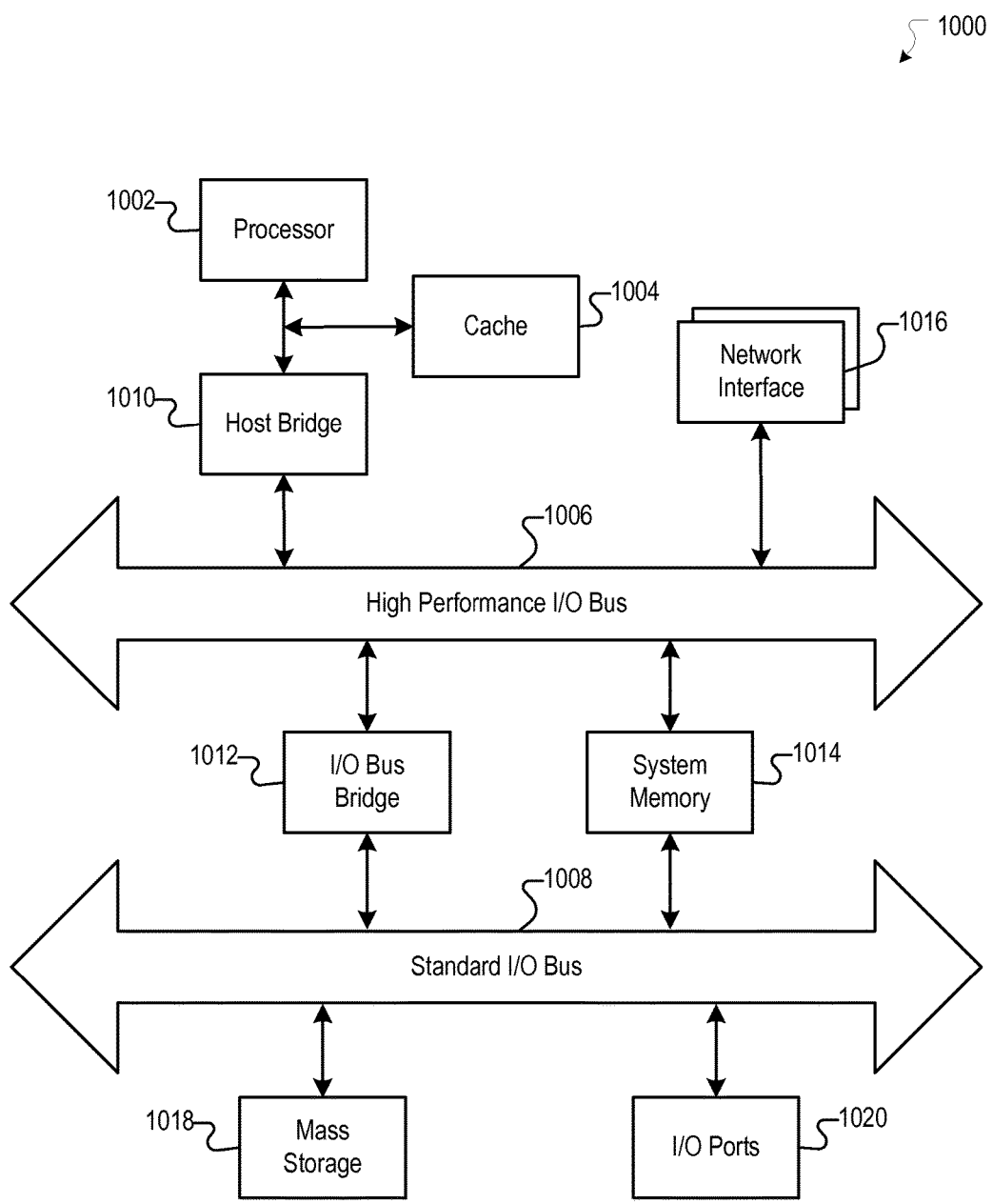
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, an indication that a user is attempting to authenticate as a particular identity;
   disabling, by the computing system, a rear-facing device camera so that only a front-facing device camera is permitted to capture media content items;
   upon determining the rear-facing device camera is disabled, acquiring, by the computing system, a media content item captured using the front-facing device camera, the media content item including graphical data representing the user;
   analyzing, by the computing system, at least in part, the graphical data to produce a confidence score representing a likelihood that the user corresponds to the particular identity, the confidence score being based in part on the graphical data representing the user corresponding to a representation of the particular identity associated with an account of the user that has been verified by a social networking system, the confidence score also being based in part on a different user represented in the graphical data, the different user being socially connected with the user through the social networking system; and
   authenticating, by the computing system, the user as the particular identity when the confidence score at least meets a specified authentication threshold.

2. The computer-implemented method of claim 1, further comprising:
   providing an instruction for user to utter a vocal response while the media content item is being captured;
   capturing, using a device microphone, audio data including the vocal response, wherein the media content item corresponds to a video, and wherein the audio data is incorporated within the video; and
   analyzing, based on a speech recognition process, the vocal response included in the audio data to determine whether the vocal response matches, within an allowable deviation, an expected response associated with the instruction, wherein the confidence score is increased when the vocal response matches the expected response within the allowable deviation.

3. The computer-implemented method of claim 1, wherein the analyzing of the graphical data includes utilizing an image analysis process to compare a representation of a face of the user included in the graphical data with a verified representation of a face associated with the particular identity.

4. The computer-implemented method of claim 1, further comprising:
   acquiring information, other than the graphical data, associated with the media content item; and
   analyzing the information associated with the media content item, wherein the confidence score is further based, at least in part, on the information associated with the media content item.

5. The computer-implemented method of claim 4, wherein the information, other than the graphical data, associated with the media content item includes at least one of audio data included in the media content item, media metadata, media resolution data, media classification data, media tag data, camera orientation data when the media content item was captured, location data when the media content item was captured, or time data when the media content item was captured.

6. The computer-implemented method of claim 5, wherein the analyzing of the information associated with the media content item includes analyzing the audio data, wherein the analyzing of the audio data includes utilizing a voice recognition process to compare a representation of a voice of the user included in the audio data with a verified representation of a voice associated with the particular identity.

7. The computer-implemented method of claim 5, wherein the analyzing of the information associated with the media content item includes analyzing the location data, wherein the analyzing of the location data includes comparing a current location of the user included in the location data with a verified location with which the particular identity is currently expected to be associated.

8. The computer-implemented method of claim 5, wherein various weight factors are assigned to the information associated with the media content item, and wherein the confidence score is based, at least in part, on the weight factors.

9. The computer-implemented method of claim 1, further comprising:
   preparing the media content item for manual review when the confidence score fails to at least meet the specified authentication threshold but at least meets a specified manual review threshold, wherein the specified authentication threshold is higher than the specified manual review threshold.

10. The computer-implemented method of claim 1, wherein the media content item includes at least one of a self-portrait image or a self-portrait video, wherein the media content item is captured live, and wherein the media content item excludes content items stored in a device media library.

11. A system comprising:
    at least one processor; and
    a memory storing instructions that, when executed by the at least one processor, cause the system to perform:
    receiving an indication that a user is attempting to authenticate as a particular identity;
    disabling a rear-facing device camera so that only a front-facing device camera is permitted to capture media content items;
    upon determining the rear-facing device camera is disabled, acquiring a media content item captured using the front-facing device camera, the media content item including graphical data representing the user;

analyzing, at least in part, the graphical data to produce a confidence score representing a likelihood that the user corresponds to the particular identity, the confidence score being based in part on the graphical data representing the user corresponding to a representation of the particular identity associated with an account of the user that has been verified by a social networking system, the confidence score also being based in part on a different user represented in the graphical data, the different user being socially connected with the user through the social networking system; and authenticating the user as the particular identity when the confidence score at least meets a specified authentication threshold.

12. The system of claim 11, wherein the instructions cause the system to further perform:

providing an instruction for user to utter a vocal response while the media content item is being captured;

capturing, using a device microphone, audio data including the vocal response, wherein the media content item corresponds to a video, and wherein the audio data is incorporated within the video; and analyzing, based on a speech recognition process, the vocal response included in the audio data to determine whether the vocal response matches, within an allowable deviation, an expected response associated with the instruction, wherein the confidence score is increased when the vocal response matches the expected response within the allowable deviation.

13. The system of claim 11, wherein the analyzing of the graphical data includes utilizing an image analysis process to compare a representation of a face of the user included in the graphical data with a verified representation of a face associated with the particular identity.

14. The system of claim 11, wherein the instructions cause the system to further perform:

acquiring information, other than the graphical data, associated with the media content item; and analyzing the information associated with the media content item, wherein the confidence score is further based, at least in part, on the information associated with the media content item.

15. The system of claim 14, wherein the information, other than the graphical data, associated with the media content item includes at least one of audio data included in the media content item, media metadata, media resolution data, media classification data, media tag data, camera orientation data when the media content item was captured, location data when the media content item was captured, or time data when the media content item was captured.

16. A non-transitory computer-readable storage medium including instructions that, when executed by at least one processor of a computing system, cause the computing system to perform:

receiving an indication that a user is attempting to authenticate as a particular identity;

disabling a rear-facing device camera so that only a front-facing device camera is permitted to capture media content items;

upon determining the rear-facing device camera is disabled, acquiring a media content item captured using the front-facing device camera, the media content item including graphical data representing the user;

analyzing, at least in part, the graphical data to produce a confidence score representing a likelihood that the user corresponds to the particular identity, the confidence score being based in part on the graphical data representing the user corresponding to a representation of the particular identity associated with an account of the user that has been verified by a social networking system, the confidence score also being based in part on a different user represented in the graphical data, the different user being socially connected with the user through the social networking system; and authenticating the user as the particular identity when the confidence score at least meets a specified authentication threshold.

17. The non-transitory computer-readable storage medium of claim 16, wherein the instructions cause the computing system to further perform:

providing an instruction for user to utter a vocal response while the media content item is being captured;

capturing, using a device microphone, audio data including the vocal response, wherein the media content item corresponds to a video, and wherein the audio data is incorporated within the video; and analyzing, based on a speech recognition process, the vocal response included in the audio data to determine whether the vocal response matches, within an allowable deviation, an expected response associated with the instruction, wherein the confidence score is increased when the vocal response matches the expected response within the allowable deviation.

18. The non-transitory computer-readable storage medium of claim 16, wherein the analyzing of the graphical data includes utilizing an image analysis process to compare a representation of a face of the user included in the graphical data with a verified representation of a face associated with the particular identity.

19. The non-transitory computer-readable storage medium of claim 16, wherein the instructions cause the computing system to further perform:

acquiring information, other than the graphical data, associated with the media content item; and analyzing the information associated with the media content item, wherein the confidence score is further based, at least in part, on the information associated with the media content item.

20. The non-transitory computer-readable storage medium of claim 19, wherein the information, other than the graphical data, associated with the media content item includes at least one of audio data included in the media content item, media metadata, media resolution data, media classification data, media tag data, camera orientation data when the media content item was captured, location data when the media content item was captured, or time data when the media content item was captured.

* * * * *